United States Patent
Khawer et al.

(10) Patent No.: US 10,205,610 B2
(45) Date of Patent: Feb. 12, 2019

(54) UPLINK PACKET ROUTING IN A SYSTEM-ON-A-CHIP BASE STATION ARCHITECTURE

(71) Applicants: Alcatel-Lucent USA Inc., Murray Hill, NJ (US); Alcatel-Lucent, Boulogne-Billancourt (FR)

(72) Inventors: Mohammad R. Khawer, Lake Hopatcong, NJ (US); Mugur Abulius, Villejuif (FR)

(73) Assignees: Alcatel Lucent, Murray Hill, NJ (US); Nokia of America Corporation, Murray Hill, NJ (US)

( * ) Notice: Subject to any disclaimer, the term of this patent is extended or adjusted under 35 U.S.C. 154(b) by 50 days.

(21) Appl. No.: 15/056,101

(22) Filed: Feb. 29, 2016

(65) Prior Publication Data
US 2017/0250838 A1    Aug. 31, 2017

(51) Int. Cl.
*H04L 12/46* (2006.01)
*H04L 12/721* (2013.01)

(52) U.S. Cl.
CPC ...... *H04L 12/4645* (2013.01); *H04L 12/4633* (2013.01); *H04L 45/66* (2013.01)

(58) Field of Classification Search
CPC ..... H01L 23/50; H04L 45/745; H04L 63/061; H04W 76/022
See application file for complete search history.

(56) References Cited

U.S. PATENT DOCUMENTS

| 6,574,221 | B1 | 6/2003 | Peterson | |
| 9,497,171 | B2* | 11/2016 | Khosravi | G06F 21/10 |
| 2004/0258008 | A1 | 12/2004 | Inoue et al. | |
| 2006/0174032 | A1* | 8/2006 | Winchester | H04L 12/4633 709/238 |
| 2008/0045226 | A1 | 2/2008 | Liu | |
| 2010/1857818 | | 7/2010 | Sheng | |
| 2012/0182929 | A1 | 7/2012 | Chen et al. | |
| 2012/0264470 | A1 | 10/2012 | Bajj et al. | |
| 2013/0179446 | A1 | 10/2013 | Lv | |
| 2014/0006908 | A1* | 1/2014 | Gruber | H04L 1/0061 714/776 |

(Continued)

OTHER PUBLICATIONS

Non-Final Office Action dated Sep. 29, 2017 for U.S. Appl. No. 15/056,049, 11 pages.

(Continued)

*Primary Examiner* — Mansour Oveissi

(57) ABSTRACT

A first system-on-a-chip (SOC) device is configured to connect to a backplane interface that is connected to a second SOC device. The first SOC device includes one or more processors to encapsulate an uplink radio bearer packet received at the first SOC device in a first header to form a first encapsulated packet. The first header includes a first address of a destination that is connected to the second SOC device by a backhaul network. The processors are also configured to encapsulate the first encapsulated packet in a second header to form a second encapsulated packet. The second header includes a second address of the second SOC device. The first SOC device also includes a hardware acceleration engine configured to transmit the second encapsulated packet from the first device board over the backplane interface.

20 Claims, 5 Drawing Sheets

(56) References Cited

U.S. PATENT DOCUMENTS

2014/0105067 A1\* 4/2014 Chen .................. H04L 41/12
370/254
2017/0249270 A1 8/2017 Khawer et al.
2017/0251419 A1 8/2017 Khawer et al.

OTHER PUBLICATIONS

Non-Final Office Action dated Aug. 27, 2018 for U.S. Appl. No. 15/056,062, 26 pages.
Notice of Allowance dated Mar. 15, 2018 for U.S. Appl. No. 15/056,049, 8 pages.

\* cited by examiner

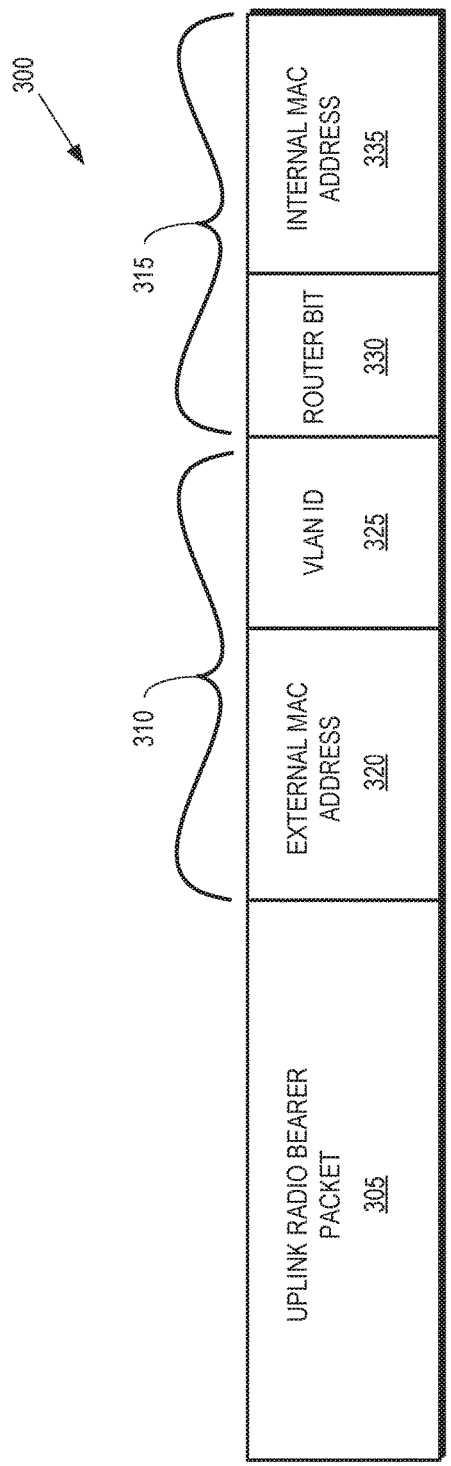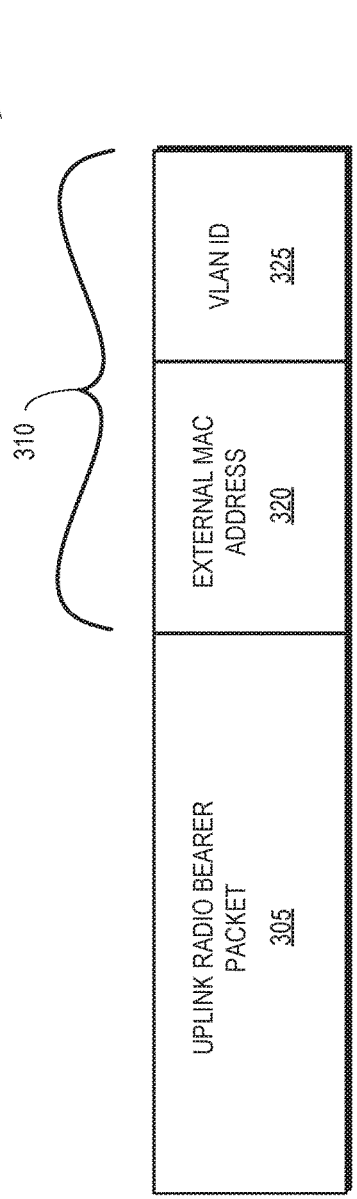
FIG. 3
FIG. 4

UPLINK PACKET ROUTING IN A SYSTEM-ON-A-CHIP BASE STATION ARCHITECTURE

BACKGROUND

Field of the Disclosure

The present disclosure relates generally to wireless communication systems and, more particularly, to routing uplink radio bearer packets in a wireless communication system.

Description of the Related Art

Conventional base stations (which may also be referred to as eNodeBs) implement two types of processor boards: a controller board and one or more modem boards. A conventional controller board includes a network processing unit (NPU) to terminate a backhaul connection to a core network of the wireless communication system and a second processor that implements a protocol stack for processing protocols such as the packet data convergence protocol (PDCP), the general packet radio service (GPRS) tunneling protocol (GTP), Internet protocol security (IPSec), and the like. No baseband processing is typically performed on the conventional controller board. Instead, the modem board performs baseband processing of signals received over the air interface or signals to be transmitted over the air interface. The modem board includes one or more digital signal processors (DSPs) to handle physical layer (or Layer 1) operations and a separate multi-core processor is employed to perform higher layer (e.g., Layer 2 and Layer 3) operations. The controller board and the one or more modem boards each require additional dedicated devices such as read-only memory (ROM), random access memory (RAM) that may be implemented using double data rate (DDR) memory, or flash memory to store generic applications, an operating system image, and the like. Interfaces must also be provided between the controller board and the one or more modem boards. Each conventional modem board with a multi core processor and DSPs can support up to three carriers, so a base station with three modem boards can support up to nine carriers and approximately 2000 connected users.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 is a block diagram of an encapsulated uplink radio bearer packet according to some embodiments.

FIG. 4 is a block diagram of a modified encapsulated uplink radio bearer packet according to some embodiments.

DETAILED DESCRIPTION

Figure 1:
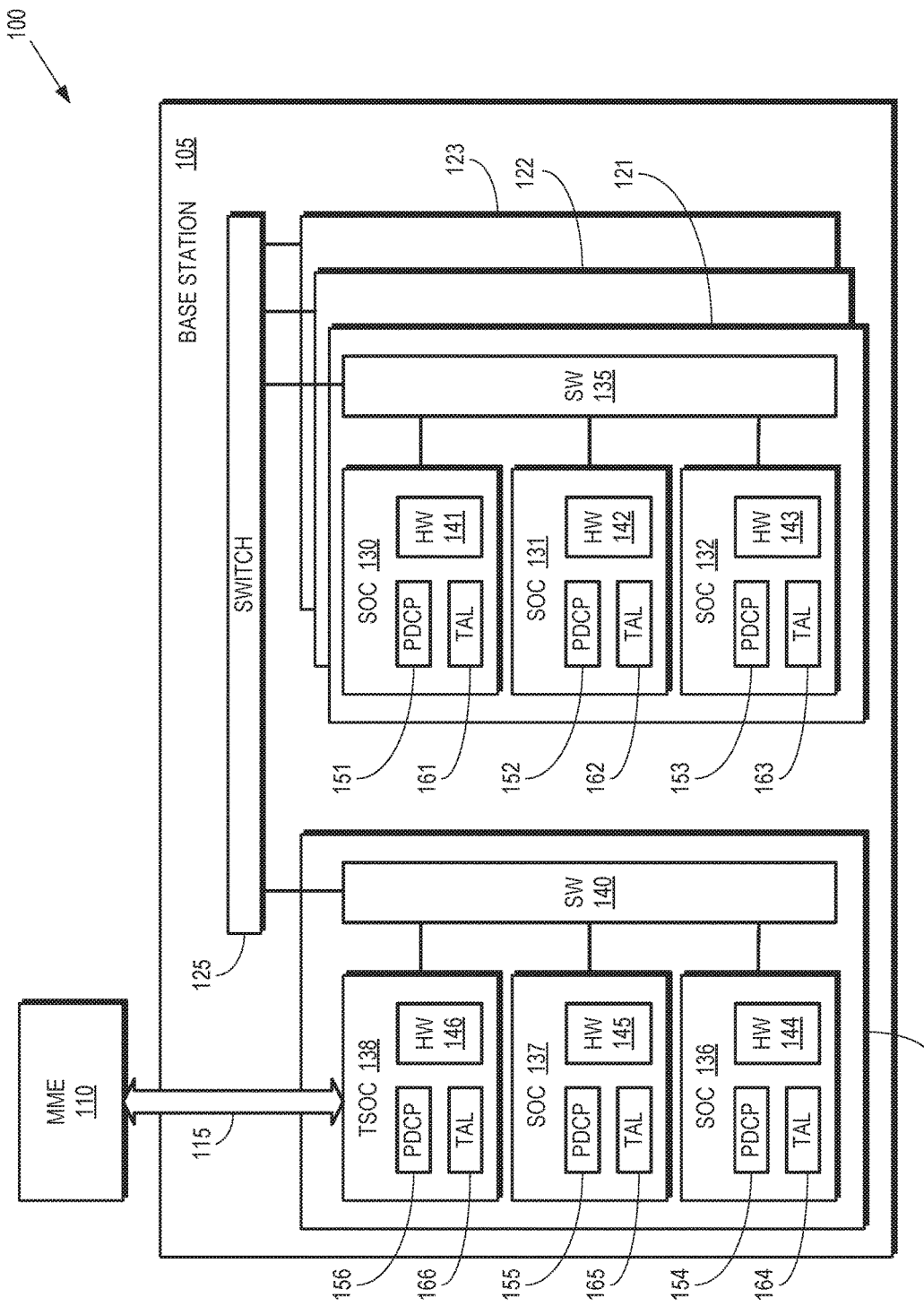
FIG. 1 is a block diagram of a wireless communication system according to some embodiments.

A conventional controller board and one or more conventional modem boards can each be replaced with a system-on-a-chip (SOC) board that can utilize one or more SOC devices. Each software-defined SOC board could be programmed to function as either a pure modem performing baseband processing or as a combined controller/modem board that terminates the backhaul interface and performs modem baseband processing for one or more carriers that are supported by one or more software-defined SOC devices. For example, one of the SOC boards, which is referred to as a transport SOC (TSOC), may be programmed to terminate the backhaul interface. The TSOC also supports up to three carriers and two additional software-defined SOC devices. The remainder of the SOC boards is programmed to support three software-defined SOC devices, which provide baseband processing for up to three carriers per SOC device. Thus, a base station that implements four SOC boards may support a total of up to 36 cellular carriers (a factor of four increase over the conventional eNodeB architecture) and may be capable of hosting up to approximately 40,000 active users (a factor of twenty increase in capacity over the conventional eNodeB architecture). Consolidating the functionality of the controller board and the modem boards onto a single system-on-a-chip (SOC) also reduces the overall device count and the cost of goods sold (COGS) for each base station, as well as also potentially reducing the size, thermal dissipation, and packaging of the base station. For example, multiple software-defined SOC devices on each SOC board can be initialized using information stored in shared ROM, RAM, or flash memories.

A centralized packet data convergence protocol (PDCP) entity, such as the PDCP implemented on a conventional controller board, would be required to determine media access control (MAC) layer addresses of destinations of each uplink packet generated by every SOC device in a base station based on IP addresses included in the uplink packet. The centralized PDCP would also be required to update the MAC header of the uplink packet with the MAC address of the destination core network entity, e.g., by replacing a packet header including the internal MAC address of the centralized PDCP with a packet header including the external MAC address that indicates the packet destination in the core network. The centralized PDCP would also have to look up a virtual local area network (VLAN) identifier for the VLAN that is used to convey the packet to its destination and attach the VLAN identifier to the packet. Consequently, a centralized PDCP cannot be scaled to support large numbers of users and would become a bottleneck for uplink packets, as well as a single point of failure for the base station. Furthermore, the processing and memory resources of the TSOC device that are required to update the target backhaul MAC addresses are dependent on the number of backhaul target destinations and consequently are not scalable. For example, the hardware accelerators in the TSoC device would be required to examine the content of each uplink packet in order to determine (based on IP addresses in the uplink packet) the destination of the packet. Once the backhaul destination is determined, the hardware accelerators would need to update the MAC header of the uplink packet with the corresponding MAC address for the destination. The extra processing cost of the external MAC address look-up and insertion of the external MAC address in every uplink packet does not scale to large numbers of users.

To address this scalability issue, the burden of generating MAC headers for uplink packets for all uplink radio bearers can be reduced by distributing the work to PDCP modules in each of the SOC devices in the base station. Each distributed PDCP module appends a first MAC header to each uplink packet (or modifies an existing header) and then encapsulates the resulting uplink packet in a second MAC header. The first MAC header includes a MAC address of a target destination and the second MAC header includes a MAC address of the TSOC. Some embodiments of the second MAC header include a field that may be set to a value to indicate that the packet includes the first MAC header and so the second MAC header is to be removed before dispatching over the backhaul interface. Upon reception of the packet, a hardware acceleration engine in the TSOC device removes the second MAC header from the uplink packet and transmits the resulting uplink packet to the target destination using the first MAC header.

Some embodiments of the SOC devices are able to access a table indicating the MAC addresses of target destinations associated with the backhaul interface. The table may be updated using address resolution protocols and made available to the distributed PDCP modules residing on the various SOC devices in the base-station. A MAC address of a network target entity may change, e.g., if its controller card is replaced and the new controller card has a new factory MAC address, but these events are relatively rare and can be detected via the address resolution protocols. The MAC addresses of all the target systems on the backhaul may therefore be determined and a list of these addresses (and associated VLAN identifiers) may be provided to all the SOCs (and associated PDCP modules) in the base station. The table can be populated (and updated) so that each PDCP module knows the external destination MAC address for each bearer and the VLAN identifier for the uplink packets.

FIG. 1 is a block diagram of a wireless communication system 100 according to some embodiments. The wireless communication system 100 includes a base station 105 that can support wireless communication over an air interface with one or more user equipment. The base station 105 is connected to a mobility management entity (MME) 110, as well as other entities in the core network, via a backhaul network 115, which may be implemented using cables, optical fibers, wireless links, and the like. The backhaul network 115 conveys signaling such as downlink radio bearer packets for transmission over the air interface by the base station 105 and uplink packets received by the base station 105 over the air interface. For example, the MME 110 may support a stream control transmission protocol (SCTP) to support datagram delivery according to the Internet Protocol (IP) and an S1 application part (S1AP) protocol for managing radio bearers, performing context transfers, mobility functions, paging, and the like. Other signaling such as configuration information may also be exchanged between the base station 105 and the MME 110 over the backhaul network 115.

The base station 105 includes a plurality of boards 120, 121, 122, 123 that are collectively referred to herein as system-on-a-chip (SOC) boards 120-123. The SOC boards 120-123 are interconnected by a switch 125, which is an Ethernet switch in some embodiments. Each of the SOC boards 120-123 includes a plurality of SOC devices that are configured to support one or more carriers for wireless communication over the air interface. For example, the SOC board 121 includes the SOC devices 130, 131, 132, which are referred to collectively as "the SOC devices 130-132." Each of the SOC devices 130-132 supports two or more independent carriers. Some embodiments of the base station 105 may include more or fewer SOC boards and each SOC board may include more or fewer SOC devices that support more or fewer carriers. A switch 135, which is an Ethernet switch in some embodiments, interconnects the SOC devices 130-132. The SOC board 120 includes the SOC devices 136, 137 and a TSOC device 138 that has been configured to terminate the backhaul network 115. Thus, uplink and downlink radio bearer packets that are conveyed over the backhaul network 115 pass through the TSOC device 138. The TSOC device 138 may also support two or more carriers for wireless communication. The SOC board 120 also includes a switch 140, which is an Ethernet switch in some embodiments. The SOC boards 121, 122, 123 also include SOC devices and an interconnecting switch, but these entities are not shown in FIG. 1 in the interest of clarity.

The SOC devices 130-132, 136-138 implement hardware (HW) acceleration engines 141, 142, 143, 144, 145, 146, which are referred to collectively as "the hardware acceleration engines 141-146." Some embodiments of the hardware acceleration engines 141-146 implement a security engine, a buffer manager, a frame manager, and a queue manager, as well as corresponding hardware queues and buffers, as discussed herein. The SOC devices 130-132, 136-138 also implement packet data convergence protocol (PDCP) modules 151, 152, 153, 154, 155, 156 (referred to collectively as "the PDCP modules 151-156") and transport abstraction layers (TALs) 161, 162, 163, 164, 165, 166 (referred to collectively as "the TALs 161-166"). The PDCP modules 151-156 and the TALs 161-166 are implemented using a plurality of processor cores in the corresponding SOC devices 130-132, 136-138.

Uplink packets are generated in the PDCP modules 151-156 of the SOC devices 130-132, 136-138 and are transmitted over a backplane to the hardware acceleration engine 146 in the TSOC 138. The backplane includes the switches 125, 135, 140. For example, the PDCP module 153 may generate uplink packets and transmit them to the hardware acceleration engine 146 via the switches 125, 135, 140. For another example, the PDCP module 154 may generate uplink packets and transmit them to the hardware acceleration engine 146 via the switch 140. As discussed herein, the processing performed on uplink packets by the hardware acceleration engine 146 should be minimized to support scalability in the wireless communication system 100. Some embodiments of the PDCP modules 151-156 are therefore configured to encapsulate uplink radio bearer packets in a first "external" header that includes an "external" address of a destination (such as the MME 110 in the core network) that is connected to the TSOC device 138 by the backhaul network 115. The PDCP modules 151-156 may also encapsulate the uplink radio bearer packet and the external header in a second "internal" header that includes a second "internal" address of the TSOC device 138. As used herein, the phrase "encapsulate in a header" indicates that the encapsulated portion of the packet is treated as a payload that is appended to the header, regardless of the contents of the payload. For example, the uplink radio bearer packet and the external header are treated as a payload of a packet having a header defined by the internal header if the uplink radio bearer packet and the external header are encapsulated by the internal header. The headers (internal or external) may contain a field that holds a value to indicate whether the packet includes an encapsulated payload with another header. If field in the outer header indicates that the packet includes an encapsulated payload, the outer header should be stripped away before transmitting the packet using the encapsulated header.

The PDCP modules 151-156 may transmit the encapsulated packets over the backplane to the TSOC 138 on the basis of the internal address. The hardware acceleration engine 146 may then strip the internal header from the uplink radio bearer packet and transmit the uplink radio bearer packet over the backhaul interface 115 on the basis of the external address included in the external header. The PDCP module 156 residing on TSOC device 138 may not have to encapsulate the external MAC address header inside the internal address header for the TSOC device 138 for all its uplink radio bearer packets. Instead, the PDCP module 156 may transmit the uplink radio bearer including a header containing the external MAC address over an internal connection to the hardware acceleration engine 146 in the TSOC device 138. In that case, the PDCP module 156 may set the field in the header to instruct the hardware acceleration engine 146 to transmit the packet as is over the interface based on the external MAC address included in the header.

Figure 2:
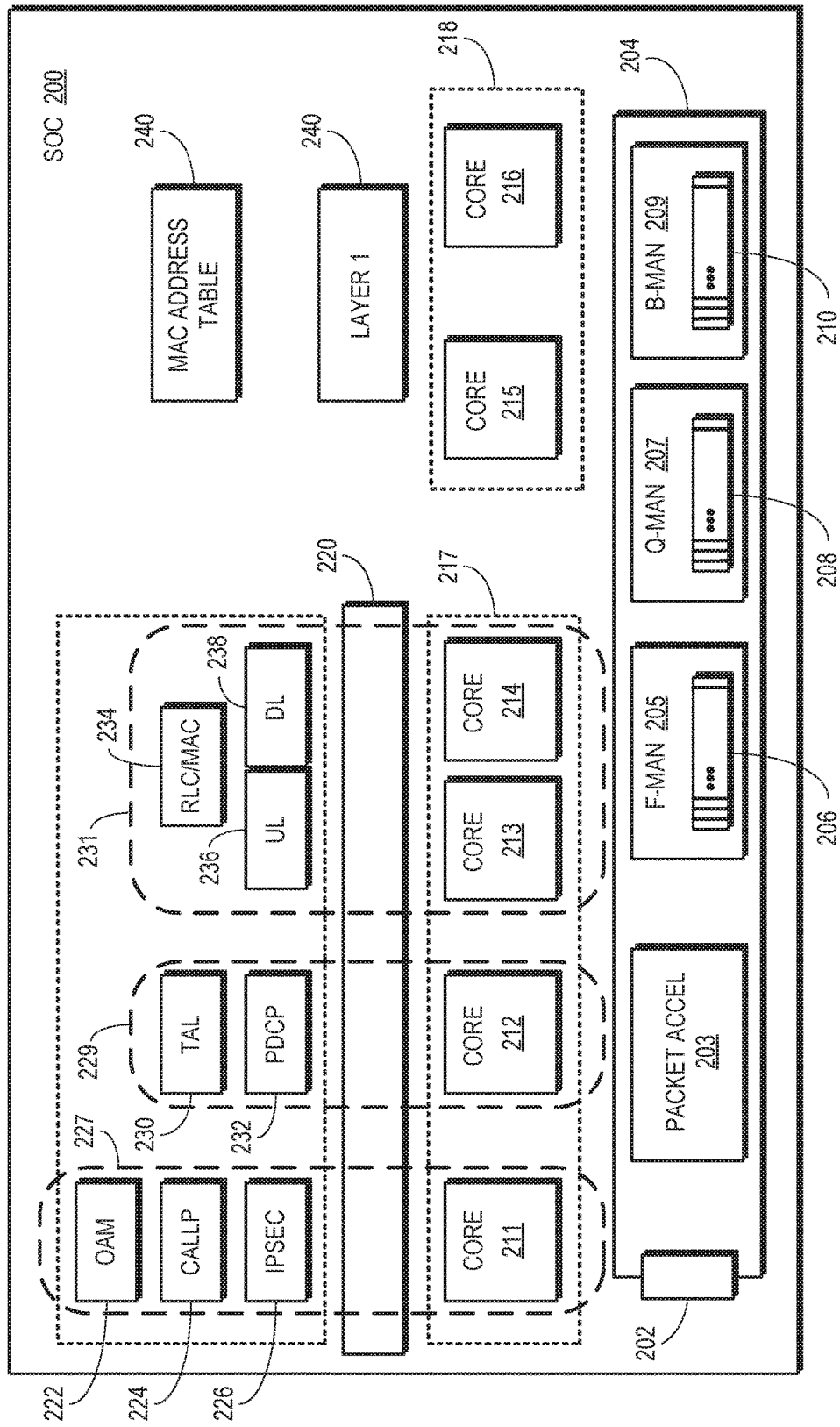
FIG. 2 is a block diagram of a system-on-a-chip (SOC) device according to some embodiments.

FIG. 2 is a block diagram of an SOC device 200 according to some embodiments. The SOC device 200 may be used to implement some embodiments of the SOC devices 130-132, 136-138 shown in FIG. 1. The SOC device 200 includes a hardware acceleration engine 204 that can be interconnected to other devices using the interface 202, which may be an Ethernet interface for connecting the SOC device 200 to an Ethernet switch or other devices. The hardware acceleration engine 204 includes a packet accelerator 203 that performs encryption or decryption of packets, e.g., according to the IPSec protocols. The hardware acceleration engine 204 also includes a frame manager (F-MAN) 205 for receiving and parsing packets, e.g., according to PCD rules configured on the hardware acceleration engine 204. The frame manager 205 has a corresponding hardware queue 206 that is used to queue packets that are to be provided to other entities in the SOC device 200. The hardware acceleration engine 204 further includes a queue manager (Q-MAN) 207 that is used to manage additional hardware queues 208, as discussed herein. The hardware acceleration engine 204 further includes a buffer manager (B-MAN) 209 that is used to perform buffering of packets using one or more buffers 210.

The SOC device 200 also includes a plurality of processor cores 211, 212, 213, 214, 215, 216, which are referred to herein as "the processor cores 211-216." In the illustrated embodiment, the processor cores 211-214 are implemented using a first type of processor such as PowerPC® cores and the processor cores 215, 216 are implemented using a second type of processor such as a digital signal processor 218. The processor cores 211-214 utilize a real time operating system (RTOS) 220, such as a symmetric multiprocessor (SMP) RTOS in a single partition configuration, as indicated by the dotted box 217. To achieve maximum system scalability a single partition consisting of all the processing cores 211-214 may be defined that is served by the single RTOS instance 220.

Some embodiments of the SOC device 200 utilize core reservation and core affinity techniques to bond different types of threads and processes to different processor cores 211-216 to achieve logical partitioning 227, 229, 231 of real time and non-real time processing on different cores within the single SMP partition 217, 220 that contains the processing cores 211-214. For example, non-real-time threads and processes produced by an operations, administration, and management (OAM) module 222, a CallP module 224 for paging user equipment, an IPSec module 226 for handling security, and other Layer 3 or higher layer modules may be bound to the processor core 211, as indicated by the dashed oval 227. Link layer (or Layer 2) modules that operate in real-time such as the TAL 230 and the PDCP 232 for the SOC device 200 may be bound to the processor core 212, as indicated by the dashed oval 229. Other real-time operations that provide backhaul support may also be bound to the processor core 212. Other Layer 2 modules that perform packet scheduling in real-time such as the radio link control (RLC)/media access control (MAC) module 234, the uplink (UL) scheduler 236, and the downlink (DL) scheduler 238 may be bound to the processor cores 213, 214, as indicated by the dashed oval 231. Physical layer (or Layer 1) functionality 240 may be bound to the processor (DSP) cores 215, 216.

As discussed herein, the PDCP module 232 may generate an uplink radio bearer packet, encapsulate it an external header that includes an external address of a network destination, and then encapsulate the packet and external header in an internal header that includes an internal address of a TSOC device. The TSOC device may be the SOC device 200 if the SOC device 200 is configured to terminate a backhaul network or the TSOC device may be a different SOC device that is connected to the SOC device 200 by a backplane. The PDCP module 232 can transmit the encapsulated packets over the backplane to the TSOC device on the basis of the internal address. The SOC device 200 includes a MAC address table 240 that includes information identifying the MAC addresses of entities connected to the backhaul network, which is connected to the TSOC device associated with the SOC device 200 or the SOC device 200 if the SOC device 200 is configured to terminate the backhaul network. The MAC address table 240 may be populated with information received from the TSOC device and the address information may be updated using address resolution protocols, e.g., in response to entities such as controller cards in eNodeBs or network entity such as MME being connected to or disconnected from the backhaul network. The PDCP module 232 may access the appropriate MAC address from the MAC address table 240, e.g., on the basis of information such as Internet Protocol (IP) addresses included in the uplink radio bearer packet received over the air interface.

In embodiments of the SOC device 200 that are configured to operate as the TSOC device, the hardware acceleration engine 204 is configured to receive the uplink radio bearer packets that were transmitted from another SOC device on the basis of the internal address and determine whether the internal header should be stripped before forwarding the uplink radio bearer packet. For example, the internal header may include a field having a value that indicates that the internal header should be stripped and the uplink radio bearer packet should be forwarded on the basis of the external address included in the external header. Depending on the value of the field, the hardware acceleration engine 204 may strip the internal header from the uplink radio bearer packet and transmit the uplink radio bearer packet over the backhaul interface on the basis of the external address included in the external header.

FIG. 3 is a block diagram of an encapsulated uplink radio bearer packet 300 according to some embodiments. The encapsulated uplink radio bearer packet 300 may be generated by a PDCP module in an SOC device, such as the PDCP modules 151-156 shown in FIG. 1 or the PDCP module 232 shown in FIG. 2. The encapsulated uplink radio bearer packet 300 includes contents of an uplink radio bearer packet 305 that was received by the SOC device over an air interface, an external header 310, and an internal header 315. Thus, the uplink radio bearer packet 305 and the external header 310 formed the payload of the encapsulated uplink radio bearer packet 300. The internal header 315 is used as the header of the encapsulated uplink radio bearer packet 300, e.g., to supply an address that is used to route the encapsulated uplink radio bearer packet 300 over an internal backplane.

The external header 310 includes information that identifies an external media access control (MAC) address 320 for a network entity that is connected to the SOC device by a backhaul network. Some embodiments of the external header 310 also include a virtual local area network (VLAN) identifier 325 that is used to indicate a VLAN that is used to convey the uplink radio bearer packet 300 to the network entity. The internal header 315 includes a router bit 325 that can be set to indicate the presence of the external header 310 and an internal MAC address 335 that indicates an address of the TSOC device that is to receive the uplink radio bearer packet 300. The hardware acceleration engine in the TSOC uses the value of the router bit 325 to determine whether to strip the internal header 315 from the uplink radio bearer packet 300. For example, the hardware acceleration engine may strip the internal header 315 from the radio bearer packet 300 and transmit the modified radio bearer packet 300 over the backhaul network if the value of the router bit 325 is set to a predetermined value such as 1. Some embodiments of the header 310 also include other information not depicted in FIG. 3.

FIG. 4 is a block diagram of a modified encapsulated uplink radio bearer packet 400 according to some embodiments. The modified uplink radio bearer packet 400 may be generated by a hardware acceleration engine in a TSOC device, such as some embodiments of the hardware acceleration engine 146 shown in FIG. 1 or some embodiments of the hardware acceleration engine 204 shown in FIG. 2. The hardware acceleration engine generates the modified encapsulated uplink radio bearer packet 400 by stripping an internal header from an encapsulated uplink radio bearer packet such as the encapsulated uplink radio bearer packet 300 shown in FIG. 3. The modified encapsulated uplink radio bearer packet 400 may therefore include contents of an uplink radio bearer packet 305 and an external header 310 that includes an external MAC address 320 and a VLAN identifier 325. The modified encapsulated uplink radio bearer packet 400 differs from the uplink radio bearer packet 300 because the internal header 315 has been stripped from the uplink radio bearer packet 300. Thus, the payload of the modified encapsulated uplink radio bearer packet 400 includes the uplink radio bearer packet 305. The external header 310 is used as the header of the modified encapsulated uplink radio bearer packet 400, e.g., to supply an address that is used to route the modified encapsulated uplink radio bearer packet 400 over a backhaul network.

Figure 5:
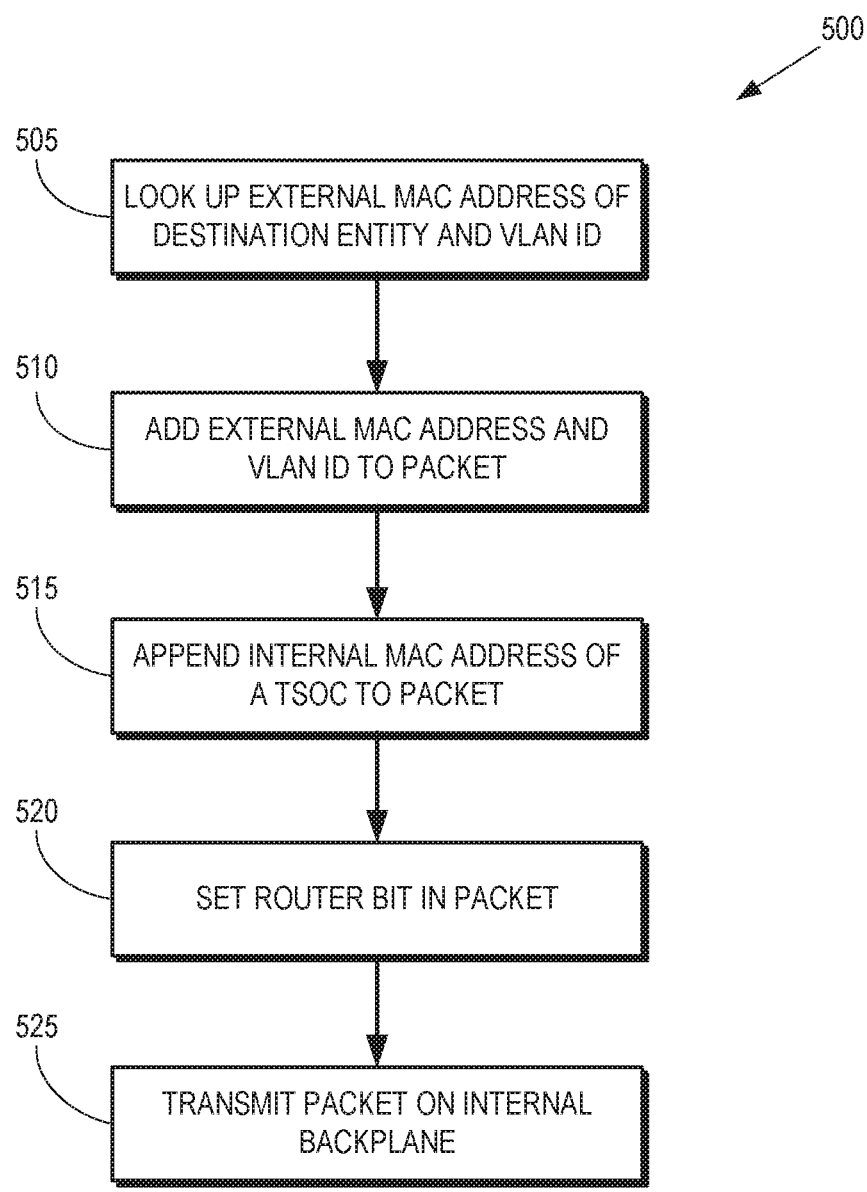
FIG. 5 is a flow diagram of a method of generating an encapsulated uplink radio bearer packet including an external header and an internal header according to some embodiments.

FIG. 5 is a flow diagram of a method 500 of encapsulating an uplink radio bearer packet using an external header and an internal header according to some embodiments. The method 500 may be implemented in some embodiments of the PDCP modules 151-156 shown in FIG. 1 or the PDCP module 232 shown in FIG. 2. At block 505, the PDCP module looks up an external MAC address of a destination entity and a VLAN identifier on the basis of information included in an uplink radio bearer packet received by the SOC device that hosts the PDCP module. For example, the PDCP module may access a table that includes information indicating the external MAC address and the VLAN identifier. At block 510, the PDCP module adds the external MAC address and the VLAN identifier to the uplink radio bearer packet. For example, the PDCP module may encapsulate the uplink radio bearer packet in an external header that includes the external MAC address and the VLAN identifier.

The PDCP module also encapsulates the uplink radio bearer packet in an internal header. Some embodiments of the PDCP module encapsulate the uplink radio bearer packet in the internal header by appending an internal MAC address to the uplink radio bearer packet at block 515. The internal MAC address indicates an address of the TSOC device, as discussed herein. Some embodiments of the PDCP module also set (at block 520) a value of a router bit in the internal header to indicate that the internal header encapsulates the uplink radio bearer packet and the external header, which may be used to route the uplink radio bearer packet to one or more external entities. At block 525, the SOC device transmits the encapsulated uplink radio bearer packet over an internal backplane to the TSOC device on the basis of the internal address included in the internal header.

Figure 6:
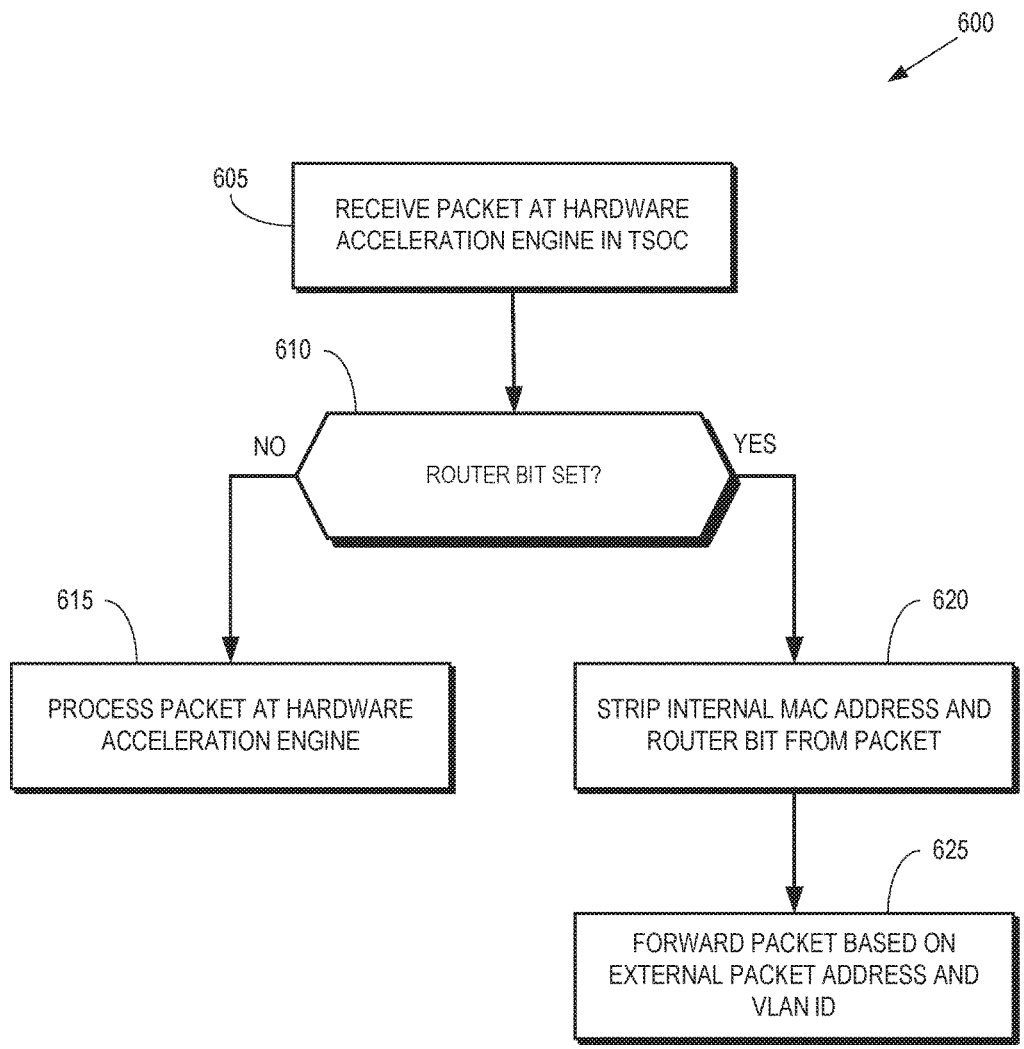
FIG. 6 is a flow diagram of a method of modifying and forwarding an encapsulated uplink radio bearer packet including an external header and an internal header according to some embodiments.

FIG. 6 is a flow diagram of a method 600 of modifying and forwarding an encapsulated uplink radio bearer packet including an external header and an internal header according to some embodiments. The method 600 may be implemented in a hardware acceleration engine that is hosted by a TSOC such as some embodiments of the hardware acceleration engine 146 shown in FIG. 1 or some embodiments of the hardware acceleration engine 204 shown in FIG. 2. At block 605, the hardware acceleration engine receives an uplink radio bearer packet that has been transmitted over an internal backplane by a PDCP module. At decision block 610, the hardware acceleration engine accesses a router bit in an internal header that encapsulates the uplink radio bearer packet. The hardware acceleration engine determines the value of the router bit. If the value of the router bit does not indicate that the uplink radio bearer packet is encapsulated by an additional external header, the hardware acceleration engine performs other required processing on the uplink radio bearer packet at block 615. If the value of the router bit indicates that the uplink radio bearer packet is encapsulated by an external header, the hardware acceleration engine modifies the uplink radio bearer packet to remove the internal header by stripping the internal MAC address and the router bit from the uplink radio bearer packet at block 620. The hardware acceleration engine then forwards (at block 625) the packet based on the external packet address and (if present) a VLAN identifier in the external header.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   encapsulating, at a first system-on-a-chip (SOC) device implemented in a base station, an uplink radio bearer packet in a first header to form a first encapsulated packet, wherein the first header includes a first address of a destination that is external to the base station and connected to a second SOC device by a backhaul network, and wherein the second SOC device is implemented in the base station and connected to the first SOC device by a backplane interface;
   encapsulating, at the first SOC device, the first encapsulated packet in a second header to form a second encapsulated packet, wherein the second header includes a second address of the second SOC device; and
   transmitting the second encapsulated packet from the first SOC device towards the second SOC device indicated by the second address over the backplane interface.

2. The method of claim 1, wherein the first header includes a first media access control (MAC) address of the destination.

3. The method of claim 2, wherein encapsulating the uplink radio bearer packet in the first header comprises accessing the first MAC address of the destination from a table stored on the first SOC device.

4. The method of claim 1, wherein encapsulating the uplink radio bearer packet in the first header comprises encapsulating the uplink radio bearer packet in the first header including a virtual local area network (VLAN) identifier associated with the backhaul network.

5. The method of claim 1, wherein encapsulating the first encapsulated packet in the second header comprises encapsulating the first encapsulated packet in the second header including a field having a value that indicates that the first header and the uplink radio bearer packet are included in a payload of the second encapsulated packet.

6. A method comprising:
   receiving, at a first system-on-a-chip (SOC) device over a backplane interface from a second SOC device, a first encapsulated packet having a first payload and a first header that includes a first address of the first SOC device, wherein the first SOC device and the second SOC device are implemented in a base station and wherein the first payload includes an uplink radio bearer packet and a second header that includes a second address that indicates a destination that is external to the base station and connected to the first SOC device by a backhaul network;
   removing, at the first SOC device, the first header from the first encapsulated packet to form a second encapsulated packet having the second header and a second payload including the uplink radio bearer packet; and
   transmitting the second encapsulated packet towards the destination indicated by the second address over the backhaul network.

7. The method of claim 6, wherein the first address is a first media access control (MAC) address of the first SOC device and the second address is a second MAC address of the destination.

8. The method of claim 7, further comprising:
   transmitting information to the second SOC device, wherein the information is used to populate a table stored on the second SOC device with MAC addresses of destinations connected to the backhaul network.

9. The method of claim 6, wherein the first header includes a virtual local area network (VLAN) identifier associated with the backhaul network.

10. The method of claim 6, wherein removing the first header from first encapsulated packet comprises removing the first header from the first encapsulated packet in response to the first header including a field having a value that indicates that the first payload of the first encapsulated packet includes the uplink radio bearer packet and the second header.

11. A first system-on-a-chip (SOC) device configured to be implemented in a base station and connect to a backplane interface that is connected to a second SOC device that is implemented in the base station, the first SOC device comprising:
   at least one processor configured to:
   encapsulate an uplink radio bearer packet received at the first SOC device in a first header to form a first encapsulated packet, wherein the first header includes a first address of a destination that is external to the base station and connected to the second SOC device by a backhaul network; and encapsulate the first encapsulated packet and the first header in a second header to form a second encapsulated packet, wherein the second header includes a second address of the second SOC device; and a hardware acceleration engine configured to transmit the second encapsulated packet from the first SOC device over the backplane interface towards the second SOC device indicated by the second address.

12. The first SOC device of claim 11, wherein the first header includes a first media access control (MAC) address of the destination.

13. The first SOC device of claim 12, further comprising:
a table to store MAC addresses of destinations connected to the backhaul network, and wherein the at least one processor is configured to access the first MAC address of the destination from the table.

14. The first SOC device of claim 11, wherein the at least one processor is configured to encapsulate the uplink radio bearer packet in the first header including a virtual local area network (VLAN) identifier associated with the backhaul network.

15. The first SOC device of claim 11, wherein the at least one processor is configured to encapsulate the first encapsulated packet in the second header including a field having a value that indicates that a payload of the second encapsulated packet includes the uplink radio bearer packet and the first header.

16. A first system-on-a-chip (SOC) device configured be implemented in a base station and to connect to a backplane interface that is connected to a second SOC device that is implemented in the base station, the first SOC device comprising:
an interface for connecting to the backplane interface; and
a hardware acceleration engine configured to:

receive, via the interface, first encapsulated packet received by the second SOC device, wherein a first header of the first encapsulated packet includes a first address that identifies the first SOC device, and wherein a payload of the first encapsulated packet includes an uplink radio bearer packet and a second header that includes a second address that identifies a destination that is external to the base station and connected to the first SOC device by a backhaul network;

remove the first header from the first encapsulated packet to form a second encapsulated packet; and transmit, via the interface, the second encapsulated packet over the backhaul network towards the destination indicated by the second address.

17. The first SOC device of claim 16, wherein the first address is a first media access control (MAC) address of the first SOC device and the second address is a second MAC address of the destination.

18. The first SOC device of claim 17, wherein the first SOC device is configured to transmit information to the second SOC device, wherein the information is used to populate a table stored on the second SOC device with MAC addresses of destinations connected to the backhaul network, the MAC addresses comprise the first MAC address of the first SOC device and the second MAC address of the destination.

19. The first SOC device of claim 16, wherein the first header includes a virtual local area network (VLAN) identifier associated with the backhaul network.

20. The first SOC device of claim 16, wherein the hardware acceleration engine is configured to remove the first header from the first encapsulated packet in response to the first header including a field having a value that indicates that the payload of the first encapsulated packet includes the uplink radio bearer packet and the second header.

* * * * *